United States Patent [19]

Massey

[11] 4,431,316
[45] Feb. 14, 1984

[54] METAL FIBER-CONTAINING TEXTILE MATERIALS AND THEIR USE IN CONTAINERS TO PREVENT VOLTAGE BUILD UP

[75] Inventor: Frederick Massey, South Humberside, England

[73] Assignee: Tioxide Group PLC, Stockton-on-Tees, England

[21] Appl. No.: 485,337

[22] Filed: Apr. 15, 1983

[30] Foreign Application Priority Data

Jul. 1, 1982 [GB] United Kingdom ............... 8218974

[51] Int. Cl.³ .................... B32B 27/02; B32B 27/12; B32B 27/18; B65D 29/02
[52] U.S. Cl. ............................... 383/113; 139/425 R; 206/524.2; 383/117; 428/109; 428/229; 428/251; 428/259
[58] Field of Search ............ 206/524.2; 383/113, 383/117; 428/109, 229, 259, 251, 922; 139/425 R

[56] References Cited

U.S. PATENT DOCUMENTS

| | | |
|---|---|---|
| 1,431,918 | 10/1922 | Arthur . |
| 2,093,109 | 9/1937 | Huse ..................... 383/113 |
| 2,846,179 | 8/1958 | Monckton . |
| 3,288,175 | 11/1966 | Valko ............... 139/425 R |
| 3,678,675 | 7/1972 | Klein ................ 139/425 R |
| 3,742,664 | 7/1973 | Reding . |
| 3,961,655 | 6/1976 | Nattrass et al. . |
| 3,986,530 | 10/1976 | Maekawa ................. 428/922 |
| 4,143,796 | 3/1979 | Williamson et al. . |
| 4,147,291 | 4/1979 | Akaw et al. ............ 383/113 |
| 4,207,937 | 6/1980 | Omdal ................. 383/117 |
| 4,211,266 | 7/1980 | Massey . |
| 4,224,976 | 9/1980 | Williamson et al. ........ 383/117 |
| 4,253,507 | 3/1981 | Williamson ........... 383/113 |
| 4,264,659 | 4/1981 | Pattenden ............. 206/524.2 |
| 4,269,247 | 5/1981 | Omdal ................. 383/117 |
| 4,274,896 | 6/1981 | Bosse ................. 383/117 |

FOREIGN PATENT DOCUMENTS

1340693 12/1973 United Kingdom .
2004476 4/1979 United Kingdom .
1575297 9/1980 United Kingdom .

Primary Examiner—James C. Cannon
Attorney, Agent, or Firm—Schuyler, Banner, Birch, McKie & Beckett

[57] ABSTRACT

A fabric having anti-static properties being formed from a first woven layer of polymeric fabric, a second woven layer of polymeric fabric which contains spaced threads of staple metal fibres and an intermediate layer positioned between the first and second layers to form a moisture barrier. In its most preferred form the woven polymeric fabric is formed of woven polypropylene and the spaced threads of staple metal fibres are formed of staple stainless steel fibres carried on a central core of a synthetic material. The fabric is of particular use in the manufacture of intermediate bulk containers where it is believed is advantageous in permitting corona discharge at a very low voltage of static electricity thereby preventing any dangerous build-up of voltage which subsequently is discharged by a spark.

10 Claims, 2 Drawing Figures

METAL FIBER-CONTAINING TEXTILE MATERIALS AND THEIR USE IN CONTAINERS TO PREVENT VOLTAGE BUILD UP

This invention relates to textile materials and their use in containers for powder or granular materials.

A fabric having antistatic properties comprises a laminate of a first layer of woven polymeric fabric, a second layer of woven polymeric fabric containing spaced threads of staple metal fibres and an intermediate layer positioned between the first and second layers and adhering thereto and comprising a film of polymeric material providing a moisture barrier between the first and second layers.

According to the invention a container suitable for the transportation of powder or granular materials comprises a flexible wall, base and cover and having means for filling with and discharging said material, with said wall, base and cover being formed from a laminate comprising a first layer of woven polymeric fabric forming the inner surface of said container, a second layer of woven polymeric fabric containing spaced threads of staple metal fibres with said second layer forming the outer surface of the container and an intermediate layer positioned between the said first and second layers and adherent thereto and comprising a film of a polymeric material providing a moisture barrier for said container and means for lifting said container.

In its most preferred form the laminate has a first layer which also contains threads of staple metal fibres, and if desired the intermediate layer may also contain such threads The presence of such threads is believed to assist in providing textile material with antistatic properties and reduce the risk of a build-up of objectionable electric charges on the container during handling.

Containers formed of flexible fabric are being used in commerce more and more widely to carry free-flowable materials in bulk quantities and are widely known as Intermediate Bulk Containers. Such containers are usually formed of flexible material to facilitate collapsing and handling when empty. Usually the container will have a base and a cover and be provided with means to lift the container during use such as lifting straps. Means to fill and empty the container are usually provided and such means can be an inlet tube located in the cover and an outlet tube can be located in the base. If desired, however, a combined filling and emptying tube can be employed and in such structures the container is turned up-side down to accomplish discharge. Suitable sealing means for the inlet and/or outlet can be provided, such as draw strings which, if desired, can be provided with easily releasable cord-locking devices.

One particular useful form of container has a square horizontal cross-sectional shape, an upper cover joined to the wall and a base joined to the wall and angled to the horizontal at say 55° to 75°, more particularly from 60° to 70° to provide a discharge chute to a centrally located discharge tube. In the most preferred type of this container a plurality of flaps are secured to the base or to the lower periphery of the wall to support the base during handling and transportation and during discharge. The flaps, say at least four in number, can be maintained in position by a suitably located draw-cord which on discharge is released just sufficiently to permit the base to adopt the chosen angle and to support the base in this configuration.

If desired lifting straps which extend down the sides of the container and under the base may be provided to provide additional support to the base during transportation.

As described hereinbefore containers according to the invention are formed of the flexible laminate according to the invention. This laminate is of three layers. The first layer which is used to form the inner surface of the container is a woven fabric of polymeric material. The polymeric material may be formed in to threads or yarns or may be split film having a denier of about 1000. Typically the polymeric material is polypropylene in split film form. The second layer of the laminate is that which forms the outer surface of the bag and is similar in respect of composition to the first layer except that additional woven threads are incorporated in the fabric. Usually these additional threads will be additional warp threads spaced apart at say intervals of 1.5 cms to 3.5 cms usually about 2.0 cms. The additional threads are formed from or include staple metal fibres which are conductive to electricity as distinct from the polymeric material which will be an electrical insulator.

The third layer of the laminate is the intermediate layer positioned between the first and second layers and being a film of polymeric material of say polypropylene to provide a moisture barrier and having a thickness of from 20 to 30 microns. This intermediate layer is secured to both the first and second layers in sandwich form during manufacture of the flexible material.

Thus it will be appreciated that the outer layer of the fabric i.e. the second layer includes threads formed of or including metal staple figures. Preferably the threads have a central core of a synthetic textile material, e.g. a polyester or a polyamide textile material, and surrounding this core is spun the metal staple fibres. The threads so obtained are included in the woven fabric during manufacture.

It is believed that these metal staple fibres not only may provide a path in the fabric along which charged ions may travel but the free ends of the staple fibres protruding outwardly of the fabric may provide convenient electric corona discharge points.

In the most preferred form of container constructed in accordance with the invention the first or inner layer of woven fabric also contains spaced threads of staple metal fibres similar to that forming the second layer so that build-up of electrical charge on the inner surface during discharge is minimised. If desired when forming the laminate from similar first and second layers the two layers can be turned so that the threads of staple metal fibres cross each other an an angle say of 90°.

In addition, if desired, the intermediate film of polymeric material can also contain threads of staple metal fibres. In this case it is desirable that the film should have a thickness such that free-ends of said staple fibres project through the film to provide additional points which can assist any corona discharge which takes place.

The container of the present invention is of particular use in the transportation of powders, such as pigments, clays, fillers, minerals and other granular products which can be used in industry where spark discharges can be dangerous in dusty atmospheres or in proximity to inflammable solvents. Typical pigments are organic coloured pigments, or inorganic pigments, such as aluminium pigments, zinc pigments, iron pigments and titanium dioxide pigments and examples of granular plastics materials are chips of polyethylene or of polypropylene.

One form of container and of the fabric constructed in accordance with the invention will now be described by way of example only and with reference to the accompanying drawings in which.

Figure 1:
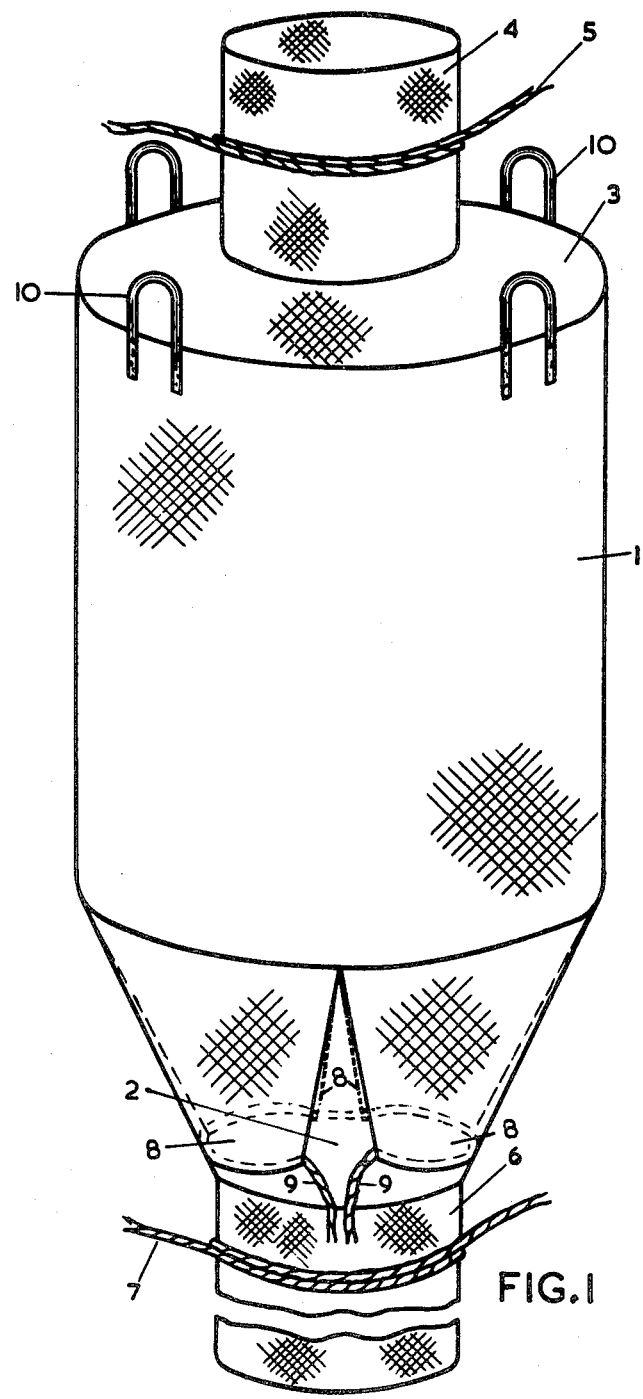
FIG. 1 shows a view of a container.

As shown in FIG. 1, the container has a cylindrical wall 1 with a base 2 attached to the lower periphery of the wall 1 and a cover 3 also attached to the wall 1. The cover 3 is provided with an inlet tube 4 equipped with a tie-cord 5.

The base 2 is angled to the horizontal plane at about 65° and is provided with a centrally heated discharge tube 6 equipped a tie-cord 7.

Four flaps of the same flexible material as is used to form the wall 1, base 2 and cover 3 of the container are attached to the lower periphery of the wall to support the base 2. The flaps have a tie-cord 9 slidably mounted along their lower edges to permit the flaps to be located tightly against the base 2 when the container is filled with powder material and also to give support to the base 2 during discharge. The container is fitted with lifting handles 10.

Figure 2:
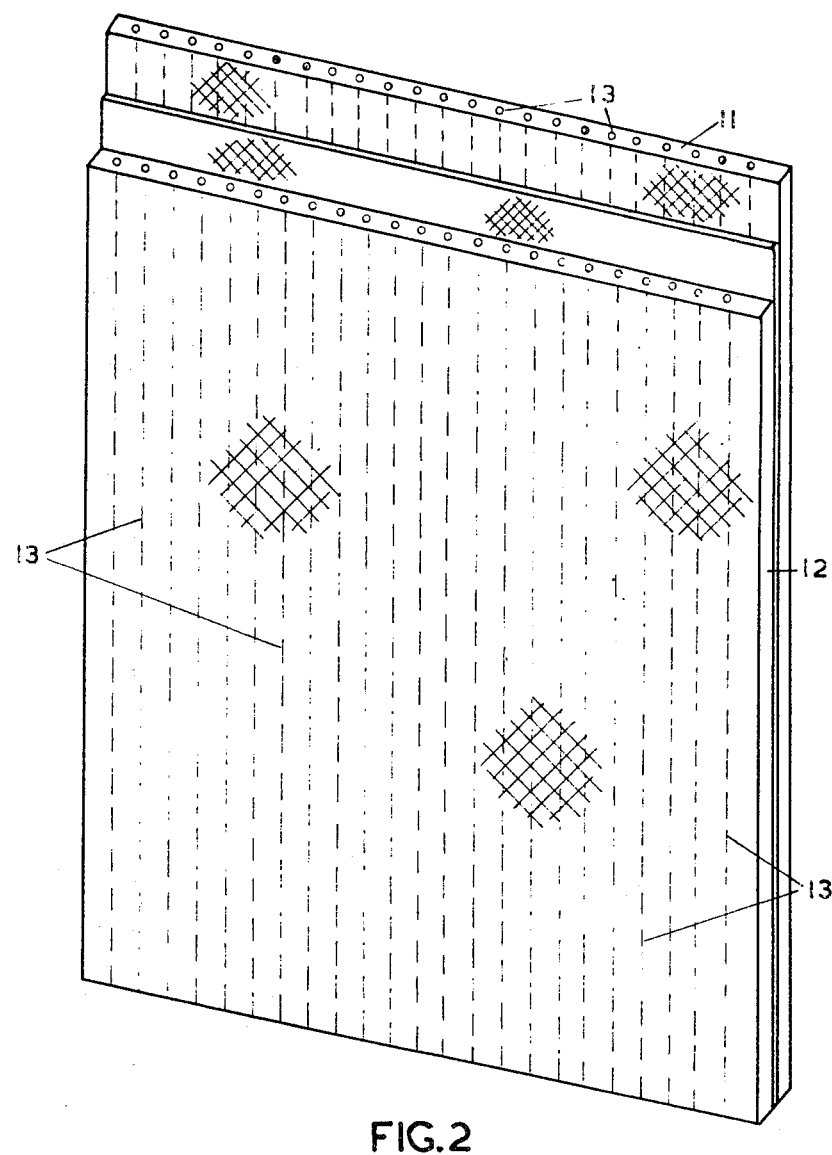
FIG. 2 is a section through the fabric.

The flexible fabric structure is shown diagrammatically in FIG. 2 and this has three layers, the two outer of which are identical in structure. Layers 11 and 12 are formed of 1000 Denier woven split polypropylene film threads and contain additional warp threads 13 at spacings of 1.75 cm formed of staple stainless steel fibres spun on a central polyester thread. Between the two layers 11 and 12 is an impermeable membrane formed of sheet polypropylene film having a thickness of 25 microns.

In use the container is filled with say titanium dioxide pigment via inlet 4 which is then closed. Discharge takes place via outlet 6 and any static electricity generation and retention is minimised as a result of the free ends of the metal fibres of the additional warp threads 13 protruding through the surface of the fabric laminate and providing corona discharge points.

I claim:

1. A fabric comprising a laminate of a first layer of woven polymeric fabric, a second layer of woven polymeric fabric containing spaced threads of staple metal fibres and an intermediate layer positioned between the first and second layers and adhering thereto and comprising a film of polymeric material providing a moisture barrier between the first and second layers.

2. A fabric according to claim 1 in which the first layer of woven polymeric fabric also contains spaced threads of staple metal fibres.

3. A fabric according to claim 1 in which the intermediate layer also contains spaced threads of staple metal fibres.

4. A fabric according to claim 1 in which the spaced threads of staple metal fibres are present as additional warp threads spaced apart at intervals of 1.5 cm to 3.5 cm.

5. A fabric according to claim 2 in which the first and second layers are so arranged with respect to one another that the threads of staple metal fibres cross each other at an angle.

6. A fabric according to claim 1 in which the threads of staple metal fibres have a central core of a synthetic textile material and the metal staple fibre is spun around the core.

7. A fabric according to claim 1 in which the intermediate layer is a film of polymeric material having a thickness of 20 to 30 microns.

8. A container suitable for the transportation of powder or granular material which comprises a flexible wall, base and cover and having means for filling with and discharging said material, with said wall, base and cover being formed from a laminate comprising a first layer of woven polymeric fabric forming the inner surface of said container, a second layer of woven polymeric fabric containing spaced threads of staple metal fibres with said second layer forming the outer surface of the container and an intermediate layer positioned between the said first and second layers and adherent thereto and comprising a film of a polymeric material providing a moisture barrier for said container and means for lifting said container.

9. A container according to claim 8 in which the first layer of woven polymeric fabric also contains spaced threads of staple metal fibres.

10. A container according to claim 8 in which the staple metal fibres are of stainless steel.

* * * * *